United States Patent
Cole

(10) Patent No.: US 6,841,102 B2
(45) Date of Patent: Jan. 11, 2005

(54) METHOD OF UTILIZING ADJUSTABLE HEIGHT BLADDER SECUREMENT MECHANISM TO EFFECT ADVANTAGEOUS BLADDER MOVEMENT DURING CURING PROCESS

(76) Inventor: John R. Cole, 1033 Top of the Hill, Akron, OH (US) 44333

( * ) Notice: Subject to any disclaimer, the term of this patent is extended or adjusted under 35 U.S.C. 154(b) by 385 days.

(21) Appl. No.: 10/119,399

(22) Filed: Apr. 9, 2002

(65) Prior Publication Data

US 2003/0189266 A1 Oct. 9, 2003

(51) Int. Cl.$^7$ .............................. B29C 35/00
(52) U.S. Cl. ................ 264/40.1; 264/315; 264/326; 425/29
(58) Field of Search ............... 264/40.1, 315, 264/326; 425/29, 58

(56) References Cited

U.S. PATENT DOCUMENTS

| | | |
|---|---|---|
| 3,336,635 A | 8/1967 | Soderquist |
| 3,976,409 A | 8/1976 | Athey |
| 4,950,141 A | 8/1990 | Maikuma et al. |
| 5,409,361 A | 4/1995 | Ichikawa et al. |
| 5,601,850 A | 2/1997 | Ureshino |
| 5,776,507 A | 7/1998 | Ureshino et al. |
| 5,798,123 A | 8/1998 | Mitamura et al. |

FOREIGN PATENT DOCUMENTS

| | | |
|---|---|---|
| DE | 198 17 822 A1 | 10/1999 |
| JP | 5-162141 * | 6/1993 |

* cited by examiner

Primary Examiner—Mathieu D. Vargot
(74) Attorney, Agent, or Firm—Brouse McDowell; Roger D. Emerson; Heather M. Barnes

(57) ABSTRACT

A method of utilizing an adjustable height bladder securement mechanism to effect advantageous bladder movement during a loading and shaping process is disclosed. A tire press comprises a lower mold, an upper mold, and a center mechanism. The center mechanism has an upper clamping mechanism for securing the upper periphery of a bladder and a lower clamping mechanism for securing the lower periphery of the bladder. A center mechanism tube has a center rod positioned therein. A piston is disposed within the center mechanism tube. The piston provides reciprocating motion to the center rod. A position sensor mechanism is operatively associated with the center mechanism. The method comprises the steps of establishing a first baseline height by first applying a set force to the center rod of the bladder securement mechanism to determine the stretch of the bladder; repeatedly curing tires with said bladder up to a certain number of cures; establishing a successive baseline height; and, comparing the first and successive baseline heights and if the difference is less than a predetermined stretch height tolerance, continuing curing tires. If the difference between the first and successive baseline heights is outside of an acceptable stretch tolerance, the bladder must be corrected, either through replacement or by adjusting the height that the center rod reaches during the loading process.

22 Claims, 6 Drawing Sheets

METHOD OF UTILIZING ADJUSTABLE HEIGHT BLADDER SECUREMENT MECHANISM TO EFFECT ADVANTAGEOUS BLADDER MOVEMENT DURING CURING PROCESS

BACKGROUND OF THE INVENTION

1. Field of Invention

This invention pertains to applications for bladder securement mechanisms for a tire press utilizing a position sensor mechanism, and more specifically to a method of utilizing an adjustable height bladder securement mechanism to effect advantageous tire shaping during the curing process.

2. Description of the Related Art

Tire presses and methods for making tires are well known in the art. FIG. 2 shows a green tire 12 undergoing a curing process in a tire press 10. The green tire 12 is placed within a cavity defined by a lower mold 14 and an upper mold 16. The lower mold 14 is fixedly installed on a base frame 18. The upper mold 16 can be closed and opened in relation to the lower mold 14. In FIG. 2, the tire press 10 is shown in the closed position.

A bladder securement mechanism 40, some aspects of which are currently known in the art, is illustrated in FIG. 1. The bladder securement mechanism 40 is commonly referred to as a "center mechanism." In the bladder securement mechanism 40, a center mechanism tube 42 is supported by a guide cylinder 44, which is fixed on the base frame 18. The upper end (or first end) 32 of a bladder 30 is held by an upper clamping mechanism 70, which is attached to the upper end 48 of a center mechanism rod 46. The center mechanism rod 46 is positioned on a piston 50 of the center mechanism tube 42. A lower clamping mechanism 80, which holds the lower end (or second end) 34 of the bladder 30, is attached to the upper end of the center mechanism tube 42 through a hub 51. A pressurized fluid is supplied by way of a first port 52 formed in the lower part of the center mechanism tube 42 to a portion below the piston 50. The pressurized fluid is also supplied from a second port 54 through a pipe 56 to a portion on the top of the piston 50. The pipe 56 passes through the piston 50 and is inserted into the center mechanism rod 46.

The piston 50 and the center mechanism rod 46 move upward together. When the bladder 30 is deformed around the lower clamping mechanism 80, a heated pressurized medium such as steam is supplied through a fluid supply tube 58 via a through hole on the hub side into the bladder 30. Then the bladder 30 comes tightly into contact with the inner side of the green tire 12.

A floating piston 60 is adapted to contact the hub 51 and is slidably attached to the center mechanism rod 46. A stacking spacer 62 is positioned above the floating piston 60, and a stretch height spacer 64 is positioned below the floating piston 60 but above the piston 50. The stacking spacer 62 and the stretch height spacer 64 are exchangeably attached to the outside of the center mechanism rod 46. The stacking spacer 62 sets the lower limit position of the upper clamping mechanism 70 so that the upper clamping mechanism 70 is set to a shaping height corresponding to the tire size. The stretch height spacer 64 limits the upper clamping mechanism's 70 upward movement.

While suited for their intended purpose, present center mechanism designs of the tire curing presses have several disadvantages, which will now be described. The art does not address the bladder compounds, their resiliency, their thickness, or other variations that happen as the bladders age due to usage. As such, over time, bladders cease to maintain their original shape and size.

Further, as different sized tires are cured, the top clamp ring of the upper clamping mechanism must be repositioned to accommodate each tire size. This requires spacers of different lengths to be changed on the center mechanism. These spacers are cumbersome to change as different sized tires are cured. In addition, valuable production time is wasted. Also, since the spacers are generally fabricated from standard pipe, their lengths are not as precise as desired. Further, the spacers are subject to wear and tear over time, which leads to further imprecision and, thereby, possible imprecision in the tire.

Another problem with traditional spacers is that adjustment of the top ring is extremely limited during the curing process because the top clamping ring cannot advance towards the bottom ring once it has contacted the spacer. Still yet, another disadvantage of utilizing spacers is that the tire press only has two positions: open and closed. There is no mechanism for fine precision to ensure the green tire will cure correctly without any flaws or inaccuracies.

Present center mechanisms are limited in performance due to the restrictive nature of the spacers. For example, bladders utilized during the curing process must be discarded once their structural integrity has been degraded and/or the bladder has stretched to such a length that they cannot be used. Currently, there is no precise method of determining when the bladder has reached the end of its life. There is an economic incentive to use bladders for their full life cycle, so that bladders are changed less often.

Once bladders have been utilized over a certain number of curing cycles, they have been permanently stretched beyond their original length. As such, when the bladder securement mechanism is lowered to position the bladder against the green tire, there is excess bladder to position. However, since there are no controls used on most bladder securement mechanism designs, the bladder cannot be precisely controlled during the shaping process.

Also, during the curing process, an operator is "blind" as to the position of the upper clamping mechanism during the curing process. There is now way for the operator to finely tune the position of the top clamp ring of the upper clamping mechanism to ensure the cured tire will be free of defects.

Therefore, a need exists in the art for a center mechanism that operates without a spacer and that overcomes the foregoing difficulties and others. The present invention is contemplated to overcome these disadvantages by utilizing a linear position sensor with the bladder securement mechanism, such that the upper clamping mechanism may be moved at any time during the loading and shaping process. Having the ability to move the upper clamping mechanism offers safety and bladder insertion advantages.

SUMMARY OF THE INVENTION

The present invention is a method of utilizing an adjustable height bladder securement mechanism to effect advantageous bladder movement during a curing process. A tire press comprises a lower mold, an upper mold, and a center mechanism. The center mechanism has an upper clamping mechanism for securing at least a portion of the upper periphery of a bladder and a lower clamping mechanism for securing at least a portion of the lower periphery of the bladder. A center mechanism tube has a center rod positioned therein. A piston is disposed within the center mechanism tube. The piston provides reciprocating motion to the center rod. A position sensor mechanism is operatively associated with the center mechanism. The method comprises the steps of applying a force to a displacement mechanism, namely, the center rod. Then, the stretch of the bladder is determined, and a first baseline height is established. Tires are repeatedly cured. Next, the bladder is checked, which may be done either manually or automatically. A force is reapplied to the displacement mechanism. It is then determined if the stretch of the bladder is within a permitted stretch tolerance. If the stretch of the bladder is within a permitted tolerance, tires continue to be cured. If the stretch of the bladder is not within a permitted tolerance, the bladder is corrected by either discarding the bladder or by applying more force to the displacement mechanism to increase the height of the center rod in order to stretch the bladder in a vertical direction. Next, a second baseline height is established. The first and second baseline heights are compared, and if the difference is within a permitted tolerance, tires are repeatedly cured. Accordingly, it is an object of the present invention to provide a method for utilizing a position sensor mechanism in conjunction with a bladder securement mechanism to advantageously shape a tire.

Another object of the present invention is to provide a method of utilizing an adjustable height bladder securement mechanism to effect advantageous bladder movement during a curing process, wherein the bladder securement mechanism further comprises a proportionate speed control mechanism for moving the upper clamping mechanism at a velocity independent from the tire press, namely, the upper mold. The method further comprises the steps of extending the bladder to a predetermined height; positioning a green tire on the lower mold; lowering the upper clamping mechanism at a predetermined velocity, the velocity being dependent upon the bladder height; pressurizing the bladder such that it comes into contact with the tire; closing the press; curing the tire; and, opening the press.

Yet, another object of the present invention is to provide a method of utilizing an adjustable height bladder securement mechanism to effect advantageous bladder movement during a curing process, wherein the velocity of the bladder securement mechanism is variable.

Still, another object of the present invention is to provide a method of utilizing an adjustable height bladder securement mechanism to effect advantageous bladder movement during a curing process further comprising the step of decreasing the velocity of the bladder securement mechanism when the upper clamping mechanism reaches a predetermined distance from the upper mold.

Further yet, another object of the present invention is to provide a method of utilizing an adjustable height bladder securement mechanism to effect advantageous bladder movement during a curing process further comprising the step of manipulating the upper clamping mechanism in a vertical direction at any time during the curing process.

Still, another object of the present invention is to provide a method of utilizing an adjustable height bladder securement mechanism to effect advantageous bladder movement during a curing process, wherein the predetermined number of cures varies.

Another object of the present invention is to provide a method of utilizing an adjustable height bladder securement mechanism to effect advantageous bladder movement during a curing process further comprising the step of translating the movement of the bladder securement mechanism and the upper clamping mechanism into a pictorial representation.

Still, another object of the present invention is to provide a method of utilizing an adjustable height bladder securement mechanism to effect advantageous bladder movement during a curing process further comprising the step of discarding the bladder after its height exceeds a predetermined stretch limit or useful life.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and herein.

DESCRIPTION OF THE PREFERRED EMBODIMENT

Figure 1:
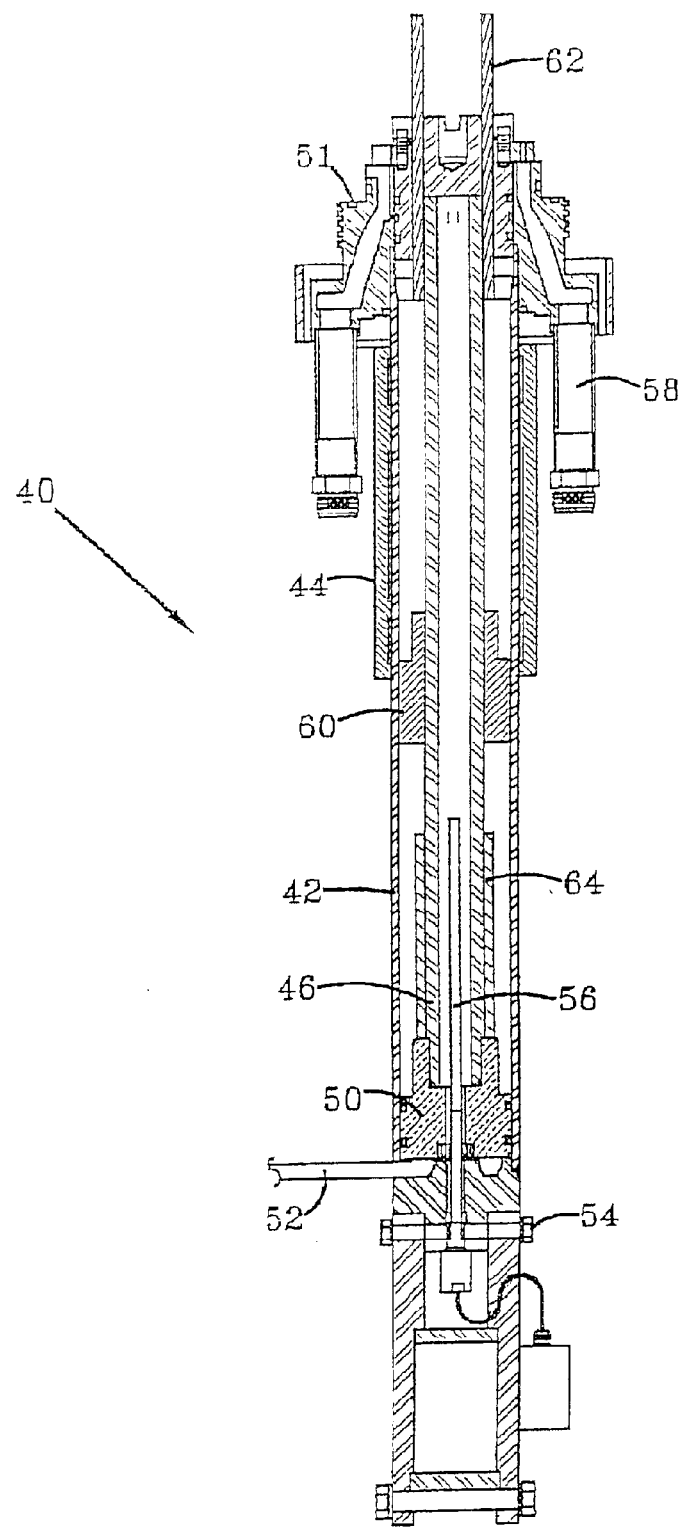
FIG. 1 is a cross sectional view of a bladder securement mechanism for a tire press known in the art.

Referring now to the drawings wherein the showings are for purposes of illustrating a preferred embodiment of the invention only and not for purposes of limiting the same, FIGS. 2–6 illustrate a tire press 10 and a bladder securement mechanism 40 having a position sensor mechanism 100 operatively associated therewith. It should be understood that the present invention may be used with any tire press known in the art, such as a dome press or a platen press. The tire press illustrated in the FIGURES operates with a bladder securement mechanism, and serves as one possible example.

Figure 2:
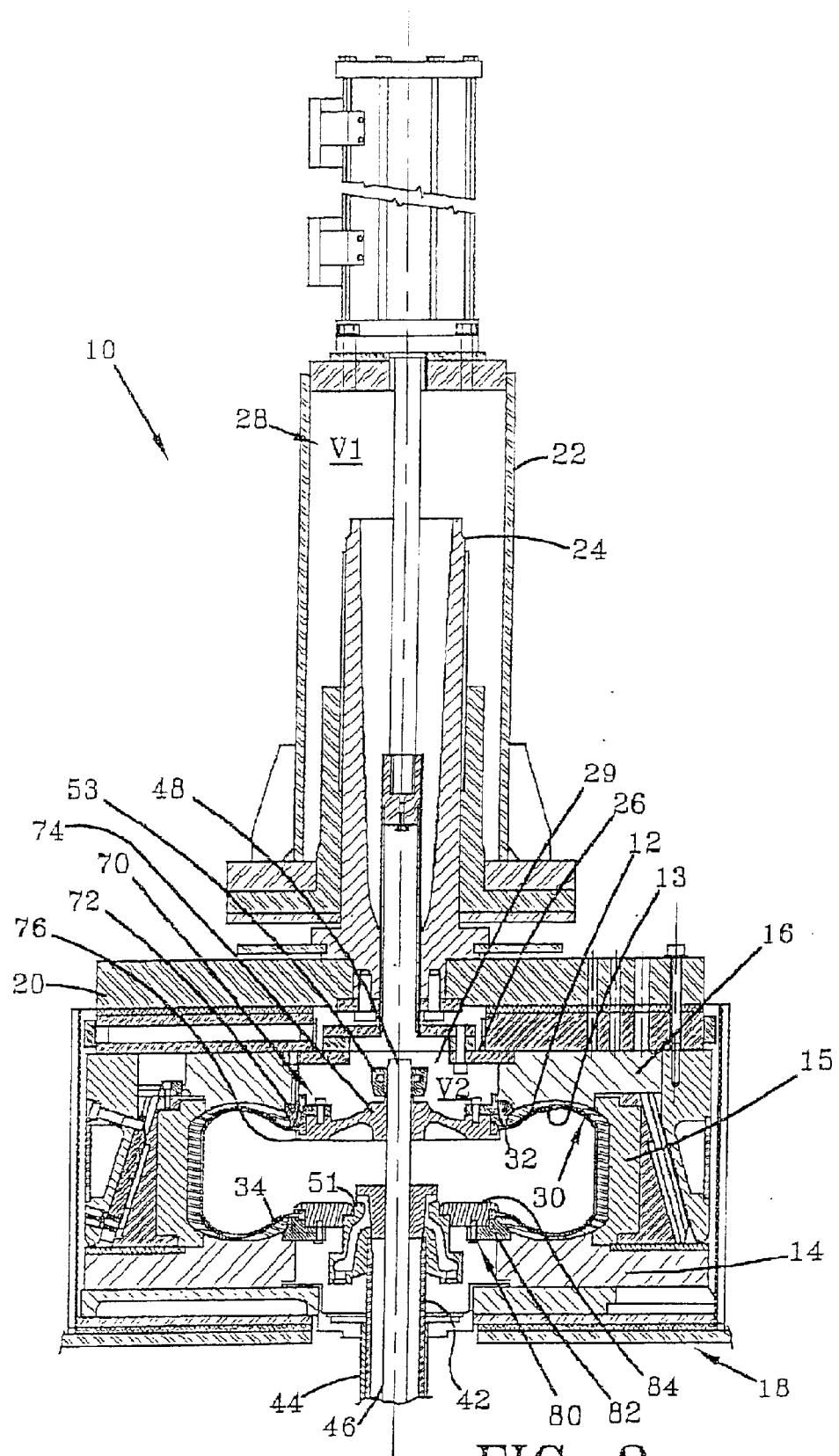
FIG. 2 is a cross sectional view of a tire press utilized with the present invention.

Turning to FIG. 2, the tire press 10 is shown in a closed position. The top of the bladder securement mechanism 40 is also illustrated. The tire press 10 comprises a lower mold 14 and an upper mold 16 defining a cavity therein when the upper mold 16 contacts the lower mold 14. The lower mold 14 is fixedly installed on a base frame 18. The upper mold 16 can be opened and closed relative to the lower mold 14. A tread ring 15 is positioned between the lower mold 14 and the upper mold 16. It should be understood that the inventive method described herein may be utilized with a segmented mold 15 as shown in FIG. 2, or simply with a two piece mold design encompassing upper and lower mold halves 14, 16. A green tire 12 is snugly received within the lower mold 14, the upper mold 16, and the tread ring 15. A bladder 30 is in tight contact with the inner face 13 of the green tire 12, thereby shaping the tire 12. In order to prevent tire defects, the bladder 30 should not have any bulges or ripples when it contacts the green tire 12. The contact between the bladder 30 and the green tire 12 should be smooth and continuous.

Still viewing FIG. 2, the tire press 10 also comprises a platen support 20 positioned above the upper mold 16. A press beam 22 extends upwardly from the platen support 20, and an upper adjusting screw 24 is positioned within the press beam 22. A mold actuating ring 26, which may be a segmented mold actuating ring, is operatively connected to the upper mold 16. The mold actuating ring 26 and the press beam 22 define a first void 28 having a volume V1. The actuating ring 26 and an upper clamping mechanism 70 define a second void 29 having a volume V2. The first and second voids 28, 29 are adapted to contain excess pressure released from the tire 12 during the curing process.

Figure 3:
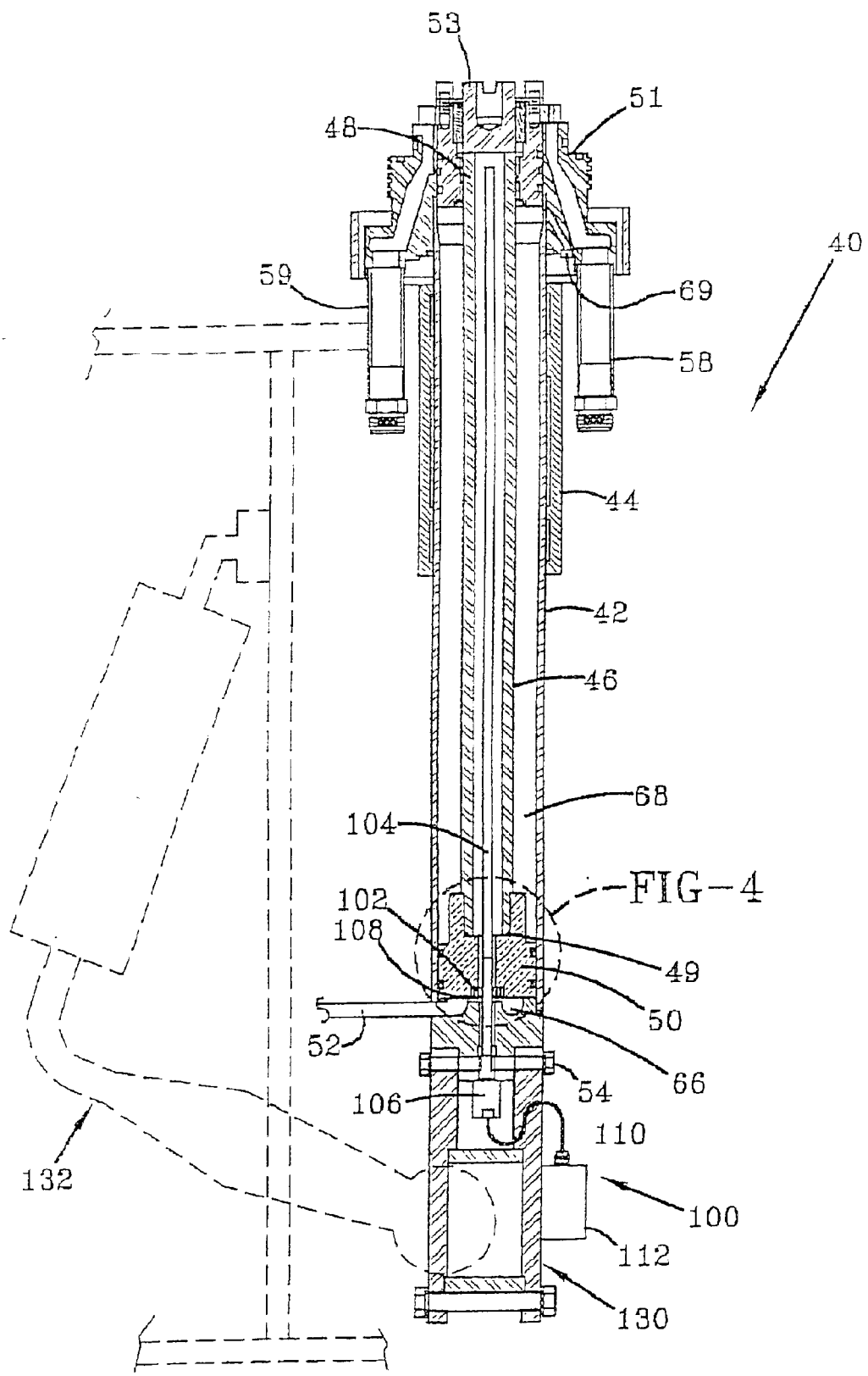
FIG. 3 is a cross sectional view of a bladder securement mechanism utilizing a position sensor mechanism.

Turning to FIGS. 2 and 3, the bladder securement mechanism 40 comprises the upper clamping mechanism 70, which includes an upper mold ring 72, a top bladder clamp ring 74, and a top bladder lock ring 76. The top bladder clamp ring 74 and the top bladder lock ring 76, which are fastened together, secure the upper periphery 32 of the bladder 30. A lower clamping mechanism 80 secures the lower periphery of the bladder 34. The lower clamping mechanism 80 comprises a lower mold ring 82 attached to a lower bladder clamp ring 84. As is well known in the art, the lower mold ring 82 forms the bead of the tire 12 with the bladder 30. The lower mold ring 82 is also utilized to strip the tire 12 from the mold after the curing cycle.

As shown in FIGS. 2 and 3, the bladder securement mechanism 40 further comprises a cylindrical center mechanism guide 44 securely attached to the base frame 18. The center mechanism guide 44 surrounds an upper portion of a center mechanism tube 42. The center mechanism guide 44 provides support and maintains the alignment of the center mechanism tube 42 as it rises and lowers in a vertical direction during the tire curing process. A center mechanism hub 51 attaches to the center mechanism tube 42 and is threadably secured to the lower bladder clamp ring 84. Positioned within the center mechanism tube 42 is a center mechanism rod 46, having a first end 48 and a second end 49. The first end 48 is fixedly attached to the top clamp ring 74 through a post clamp 53. The second end 49 of the center mechanism rod 46 is connected to a piston 50. Tubes 58, 59 are connected to the center mechanism hub 51. The tubes 58, 59 facilitate the pressurization and depressurization of the bladder 30 during the curing cycle.

The center mechanism rod 46 is lifted together with the piston 50 when a working fluid, such as water or oil, is supplied to a first space portion 66 located beneath the piston 50, thereby lifting the upper periphery 32 of the bladder 30, which is held by the upper clamping mechanism 70. Conversely, when the working fluid is supplied to a second space portion 68 within the center mechanism rod 46, the center mechanism rod 46 travels downward with the piston 50, thereby lowering the upper periphery 32 of the bladder 30.

Figure 4:
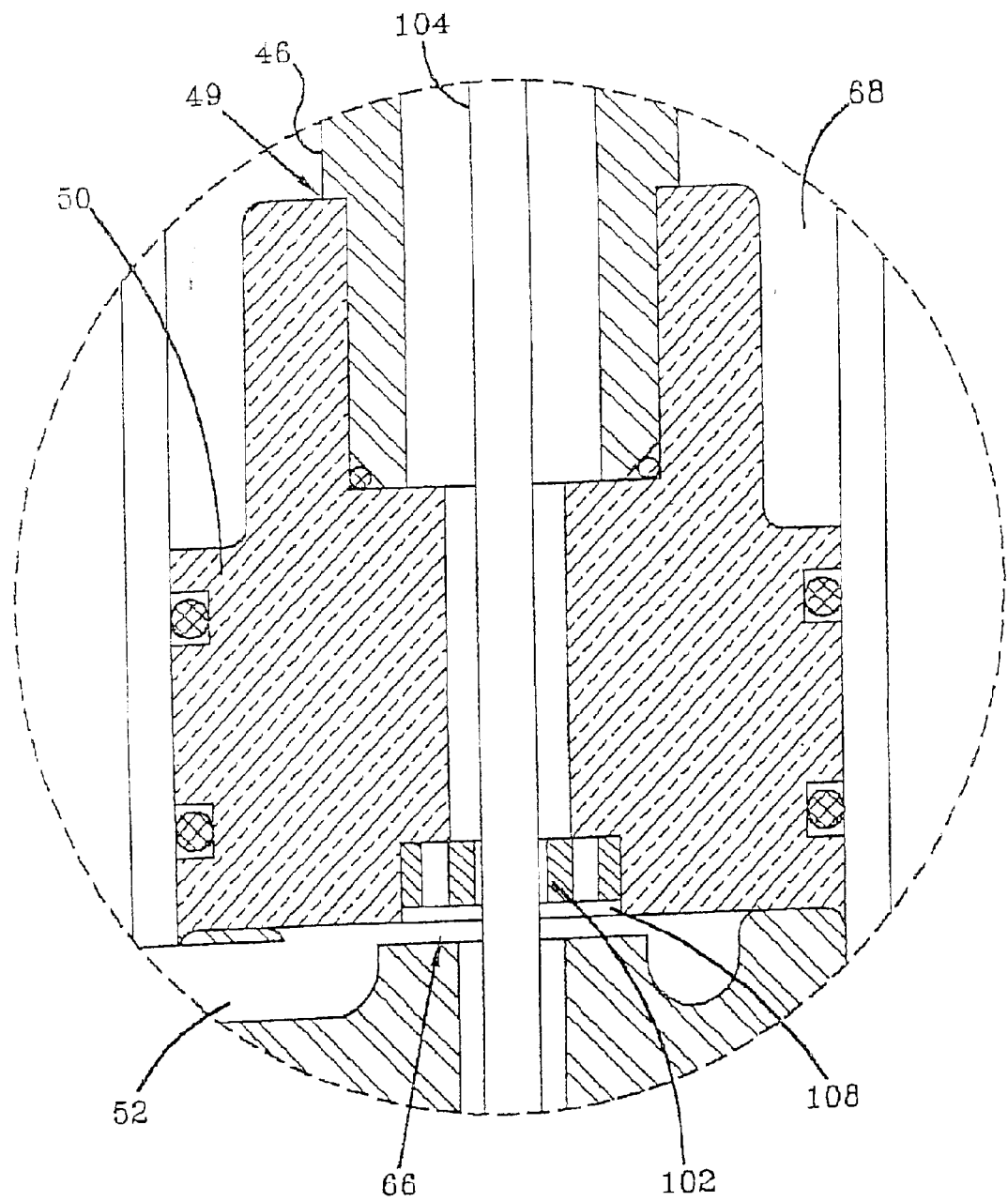
FIG. 4 is an enlarged view of the piston and magnet of FIG. 3.
Figure 5:
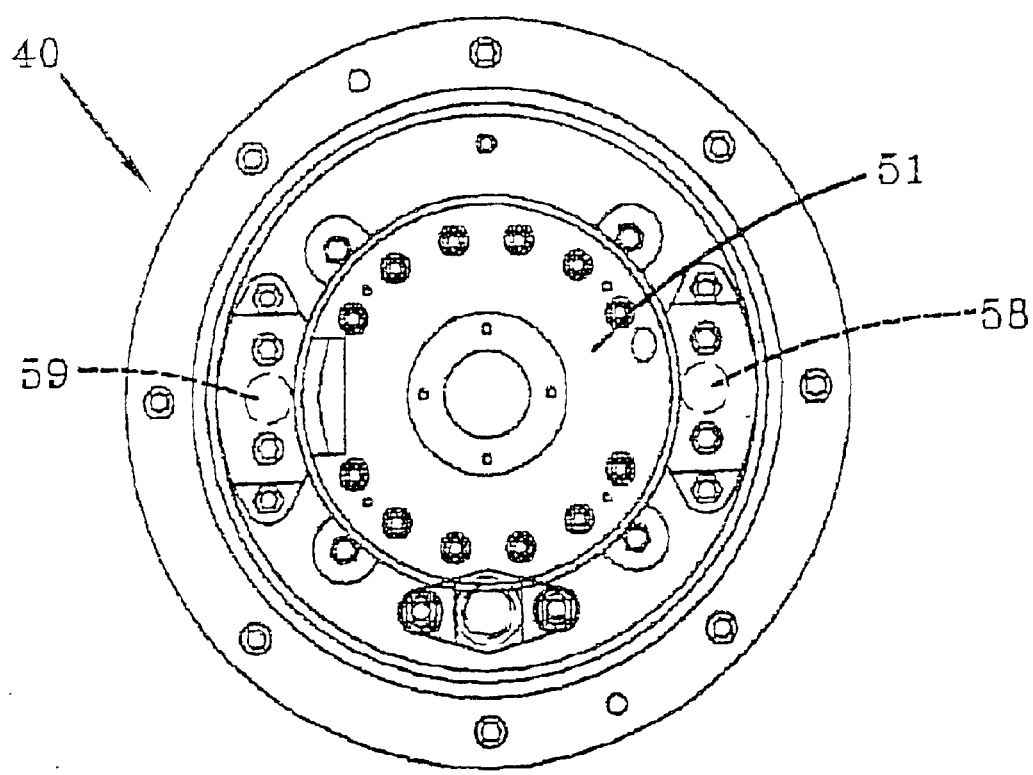
FIG. 5 is a top view of FIG. 3.

In order to limit the height of the upper clamping mechanism 70, a position sensor mechanism 100 is utilized in conjunction with the bladder securement mechanism 40. As such, the stretch height spacer, the stacking spacer, and the floating piston may be eliminated. What is meant by the term "position sensor mechanism" is any mechanism, whether electrical and/or mechanical, that controls the movement of the upper clamping mechanism and/or the lower clamping mechanism such that the bladder may be repeatedly stretched to determine its current stretch height. It should be noted that the position sensor mechanism 100 described herein serves as one possible example of the mechanism which enables movement of the upper (or lower) clamping mechanism. As best seen in FIGS. 3 and 4, the piston 50 may be welded to the second end 49 of the center mechanism rod 46. Of course, the piston 50 may be secured to the second end 49 of the center mechanism rod 46 through any other means chosen in accordance with sound engineering judgment. The position sensor mechanism 100 comprises a floating magnet 102, a linear sensing rod 104, and a signal generating unit 106. The floating magnet 102 is fixedly attached to the piston 50 through a snap ring 108. The floating magnet 102 is laterally spaced from the linear sensing rod 104 as it travels vertically with the piston 50 through the center mechanism rod 46. A cable 110 takes mechanical positioning magnetically induced signals from the signal generating unit 106 and passes them through to a remote electronics module 112, which is associated with a control system 114 ("controller"), shown schematically in FIG. 6. When the working fluid is introduced through tube 52 and into the first space portion 66 below the piston 50, the magnet 102 is lifted with the piston 50, and the linear sensing rod 104 senses the position of the magnet 102, which is detected by the signal generating unit 106 as a travel amount of the piston 50. The travel amount of the piston 50 is transmitted to the controller 114. Based upon the travel amount of the piston 50, the controller 114 controls the vertical movement of the top clamp ring 74. The height of the bladder 30, which corresponds to the tire size, is set to the lower limit position of the top clamp ring 74.

Through the position sensor mechanism 100, the top clamp ring 74 may be moved and adjusted in a vertical direction during the curing process so that the bladder 30 properly contacts the green tire 12 to prevent defects from forming during the curing cycle. It is also contemplated to be within the scope of the present invention to translate the movement of the bladder securement mechanism 40 into a pictorial representation on a monitor 118 of the control system 114. This enables the tire press operator to easily see the position of the bladder securement mechanism 40 after the tire press is closed, especially the placement of the top clamp ring 74, and to provide any required adjustments.

Figure 6:
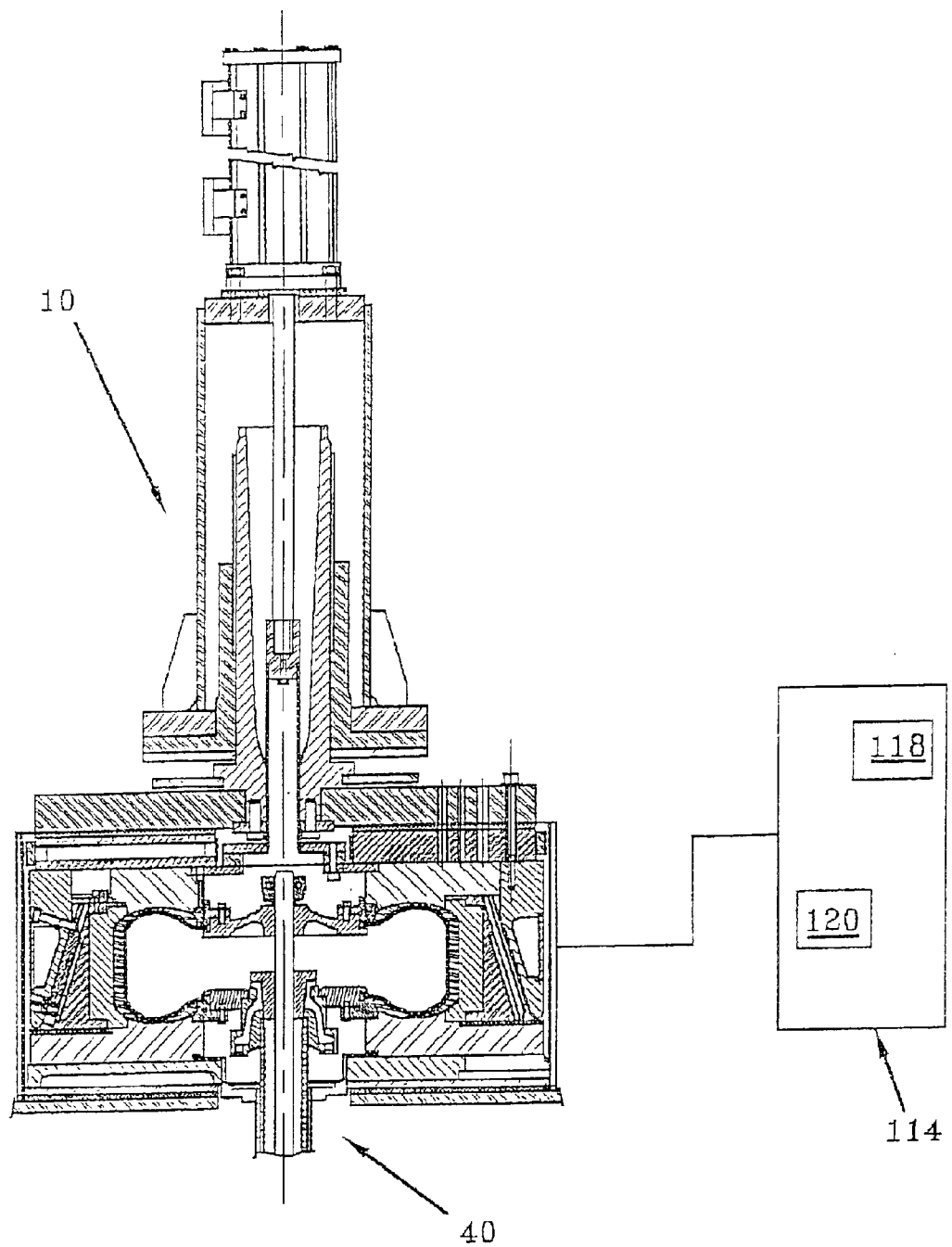
FIG. 6 is an elevational view of the tire press and a schematic drawing of the controller.

With reference to FIGS. 3 and 6, a proportionate speed control mechanism 120 is operatively associated with the bladder securement mechanism 40 and is in communication with the controller 114. The proportionate speed control mechanism 120 may take the form of any electronic control system that provides for programmable height control of the top clamp ring 74. For example, the proportionate speed control mechanism 120 may be a programmable logic controller (PLC).

As previously stated, the proportionate speed control mechanism 120 provides height control of the upper clamping mechanism 70, namely, through the top clamp ring 74. The proportionate speed control mechanism 120 enables the operator to control the top clamp ring 74 velocity independent from the tire press 10, and more specifically, the velocity of the upper mold 16. Because the top clamp ring 74 may move independently from the upper mold 16, the bladder 30 can be better positioned against the green tire 12. The velocity at which the top clamp ring 74 is moved is dependent upon the current height of the bladder 30. As the bladder 30 becomes stretched after numerous curing cycles, more care is needed when lowering the top clamp ring 74 to ensure that the bladder 30 properly contacts the green tire 12. For example, it may be desirable to lower the top clamp ring 74 quickly at first, but as the top clamp ring 74 reaches a predetermined distance from the upper mold 16, the top clamp ring 74 may be decreased in order to avoid bulges in the bladder 30.

Continuing to view FIG. 3, an interfacing system 130 facilitates lifting the entire center mechanism 40 upward for tire removal. Kinematics 132, which enables the lifting of the bladder securement mechanism 40, are depicted in phantom lines. The kinematics 132 are well known in the art and will not be further described herein.

Next, the mode of operation of the tire press 10 and its bladder securement mechanism 40 described above will be explained. The bladder 30 is tensioned in an extended state with the center mechanism tube 42 placed in the bottom position and with the center mechanism rod 46 placed in the top position. Then the green tire 12 is inserted onto the lower mold 14. After the insertion of the tire 12, the piston 50 and the center mechanism rod 46 are lowered to move the top clamp ring 74 downward until the bladder 30 conforms to the inner surface of the tire 12 while being curved and deformed. The velocity of the top clamp ring 74 is controlled through the proportionate speed control mechanism 120. The linear sensing rod 104 senses the travel amount of the piston 50 by the magnet 102, thereby monitoring the fall of the top clamp ring 74 and a signal of the travel amount is generated to the controller 114. The controller 114 controls the supply of the working fluid to the center mechanism tube 42 to lower the top clamp ring 74 so that the lower limit position of the top clamp ring 74 is set to the shaping height corresponding to the tire size.

A heated, pressurized medium, such as steam, is injected into the bladder 30 through tube 58 to fully expand the bladder 30 for shaping. The bladder 30 comes into close contact with the inner surface of the tire 12. Subsequently, the upper mold 16 is closed to the lower mold 14 for curing the green tire 12.

After the cure, the upper mold 16 is opened and made to retreat to allow the center mechanism tube 42 to move upward together with the center mechanism rod 46, and then the tire 12 is separated and raised off the lower mold 14. The center mechanism rod 46 is moved upward while the center mechanism tube 42 is moved downward, thus pulling out the bladder 30 from the inner surface of the tire 12 with which the bladder 30 is in close contact. Next, this post-cure tire 12 is removed upwardly by means of a tire unloader or other means (not shown), being discharged out of the tire press 10.

As is well known in the art, bladders 30 have a finite life cycle, and they need to be changed regularly to ensure proper tire formation. A defect in the bladder 30 could result in a deformed tire, which is not suitable for use. It is desirable for tire manufacturers to have minimal defective tires in order to maintain low overhead costs. One way to help minimize overhead costs is to utilize the bladder 30 for as many cures as possible without compromising the quality of the tire. This is accomplished through the position sensor mechanism 100 previously described.

In order to maximize the life cycle of the bladder, the following steps are taken. First, a force is applied to the center rod 46 of the bladder securement mechanism 40 to determine how far the bladder 30 should stretch in a vertical direction. Once properly stretched in the vertical direction, a first baseline height of the bladder 30 is established by determining the distance moved by the piston 50. The distance is generated into a signal and sent to the controller 114. This distance is recorded as the first baseline height. Since bladders 30 vary in their geometric dimensions, including diameter, height and thickness, the first baseline height will depend on the particular bladder 30 chosen for the tire size that is being cured in the tire press. Further, because of the variance in bladders 30, pressures needed to move the center rod 46 or the displacement mechanism will vary. As such, a generalized pressure cannot be determined since it depends on each and every application.

Tires are repeatedly cured for either a number of predetermined cycles or for a number or random cycles. Next, the bladder 30 should be checked to ensure that it is within the permitted stretch tolerance. Checking may either be manual or automatic. Checking manually may be through an operator's observation. Alternatively, an automatic check may be based with the controls in the controller 114. A set force is reapplied to a displacement mechanism, namely, the center rod 46, either manually or automatically. It should be understood that the displacement mechanism may be any mechanical, electrical or electromechanical device or system that enables the bladder 30 to be placed in tension. It is then determined whether or not the stretch of the bladder 30 is within a permitted stretch tolerance. This may be through a device that reads a diameter of the bladder 30, such as a light beam (not shown) or an electric eye (not shown). If the bladder 30 is within a permitted tolerance, tires may continue to be cured. Further, if the bladder 30 is not within a permitted tolerance, the bladder 30 is corrected. Until now, correction was performed by discarding the bladder 30 and replacing it. This may still be an appropriate course of action if the bladder 30 has reached the end of its life cycle. However, correction may be performed by placing an increased force on the displacement mechanism to increase the vertical height of the bladder 30. When an increased force is applied to the displacement mechanism or center rod 46, a successive baseline height is established. The successive baseline height and the first baseline height are compared, and if the difference between the two heights is within a permitted tolerance, the bladder 30 may be used for a continued number of cures (random or predetermined). After a number of tires have been cured, another successive baseline height is recorded in the same manner previously described. By following this method, the full life of the bladder 30 is utilized before it is discarded.

As the difference between the first and second baseline readings increases, the number of predetermined curing cycles should decrease. Further, it should be noted that correcting the bladder 30 and checking the bladder 30 may be done in any combination of manual or automatic operations described above.

The invention has been described with reference to preferred embodiment. Obviously, modifications and alterations will occur to others upon a reading and understanding of this specification. It is intended to include all such modifications and alternations in so far as they come within the scope of the appended claims or the equivalence thereof.

What is claimed is:

1. A method affecting bladder movement during a curing process, the method comprising the steps of:

providing a tire press with a bladder securement mechanism, the bladder securement mechanism comprising an upper clamping mechanism for securing at least a portion of a first end of a bladder, a lower clamping mechanism for securing at least a portion of a second end of the bladder, a displacement mechanism for moving at least one of the ends of the bladder, and a position sensor mechanism for determining the position of at least one of the clamping mechanisms;

applying a force to the displacement mechanism;

determining the stretch of the bladder;

establishing a first baseline height of the bladder;

repeatedly curing tires;

reapplying the force to the displacement mechanism; and, determining if the stretch of the bladder is within a permitted tolerance.

2. The method of claim 1, wherein determining if the stretch of the bladder is within a permitted tolerance comprises the step of:

continuing curing tires if the bladder is within a permitted tolerance.

3. The method of claim 1, wherein determining if the stretch of the bladder is within a permitted tolerance comprises the step of:
  correcting the bladder if the bladder is not within a permitted tolerance.

4. The method of claim 1, wherein determining if the stretch of the bladder is within a permitted tolerance is performed manually.

5. The method of claim 1, wherein determining if the stretch of the bladder is within a permitted tolerance is performed automatically.

6. The method of claim 3, wherein correcting the bladder further comprises the step of:
  applying an increased force to the displacement mechanism.

7. The method of claim 6, further comprising the step of:
  establishing a successive baseline height; and,
  continuing curing tires if the difference between the first and successive baseline heights is within a permitted tolerance.

8. The method of claim 3, wherein correcting the bladder further comprises the step of:
  replacing the bladder.

9. The method of claim 3, wherein correcting the bladder is performed manually.

10. The method of claim 3, wherein correcting the bladder is performed automatically.

11. The method of claim 1, wherein the bladder securement mechanism further comprises a proportionate speed control mechanism for moving the upper clamping mechanism at a velocity independent from associated tire press components.

12. The method of claim 11, further comprising the step of:
  controlling the velocity of the bladder securement mechanism.

13. The method of claim 12, further comprising the step of:
  lowering the upper clamping mechanism at a predetermined velocity such that the bladder contacts the green tire, wherein the predetermined velocity is dependent on the height of the bladder.

14. The method of claim 12, further comprising the step of:
  decreasing the velocity of the bladder securement mechanism when the upper clamping mechanism reaches a predetermined distance from a lower mold.

15. The method of claim 1, further comprising the step of:
  moving the upper clamping mechanism in a vertical direction at any time during the shaping process.

16. The method of claim 1, further comprising the step of:
  translating the movement of the bladder securement mechanism and the upper clamping mechanism into a pictorial representation.

17. A method for shaping a tire in a tire press, comprising the steps of:
  providing a tire press with a bladder securement mechanism, the bladder securement mechanism comprising an upper clamping mechanism for securing at least a portion of the upper periphery of a bladder, a lower clamping mechanism for securing at least a portion of the lower periphery of the bladder, and a position sensor mechanism for determining the position of at least one of the clamping mechanisms;
  providing a proportionate speed control mechanism for moving at least one of the clamping mechanisms at a velocity independent from associated tire press components;
  extending the bladder to a height;
  positioning a green tire in a mold;
  lowering one of the clamping mechanisms with the proportionate speed control mechanism at a controlled velocity;
  pressurizing the bladder such that it comes into contact with the tire;
  closing the press;
  curing the tire;
  opening the press;
  wherein extending the bladder to a height further comprises the step of establishing a first baseline height by first applying a force to the displacement mechanism to determine the stretch of the bladder, wherein the method further comprises the steps of:
    repeatedly curing tires with the bladder positioned at the height with a number of cures;
    establishing a successive baseline height;
    comparing the first and successive baseline heights; and,
    continuing with a second number of cures if the difference between the first and successive baseline heights is within a permitted tolerance.

18. The method of claim 17, wherein the velocity of the bladder securement mechanism is variable.

19. The method of claim 18, wherein said mold includes an upper mold and a lower mold, the method further comprising the step of:
  decreasing the velocity of the bladder securement mechanism when the upper clamping mechanism reaches a predetermined distance from the lower mold.

20. The method of claim 17, further comprising the step of:
  manipulating the upper clamping mechanism in a vertical direction at any time during the shaping process.

21. The method of claim 17, further comprising the step of:
  discarding the bladder after its height exceeds a predetermined stretch limit.

22. A method of utilizing adjustable height bladder securement mechanism to effect bladder movement during the loading and shaping process, the method comprising the steps of:
  providing a tire press with a lower mold, an upper mold, and a center mechanism, the lower mold and the upper mold defining a cavity therein when the upper mold contacts the lower mold, the center mechanism comprising an upper clamping mechanism for securing at least a portion of the upper periphery of a bladder, a lower clamping mechanism for securing at least a portion of the lower periphery of the bladder, a center mechanism tube, a center rod positioned in the tube, a piston disposed within the center mechanism tube, the piston providing reciprocating motion to the center rod through the center mechanism tube, and a position sensor mechanism for determining the position of the upper clamping mechanism;
  providing a proportionate speed control mechanism for moving the upper clamping mechanism at a controlled velocity independent from associated tire press components;

establishing a first baseline height by applying a force to the center rod so as to place the bladder in tension;

positioning a green tire on the lower mold;

lowering the upper clamping mechanism at a controlled velocity, the velocity being dependent upon the bladder height;

pressurizing the bladder such that it comes into contact with the tire;

closing the press;

moving the upper clamping mechanism at any time such that the bladder is in smooth continuous contact with the tire;

curing the tire;

opening the press;

repeatedly curing tires with the bladder positioned at the height with a number of cures;

establishing a successive baseline height by reapplying the force to the center rod to place the bladder in tension;

comparing the first and successive baseline heights; and, continuing with a second number of cures if the difference between the first and successive baseline heights is less than a predetermined stretch height tolerance.

* * * * *